June 29, 1965     B. D. BEAMISH     3,191,508
METHOD OF MANUFACTURING CONTAINERS
Original Filed Feb. 12, 1960     2 Sheets-Sheet 1
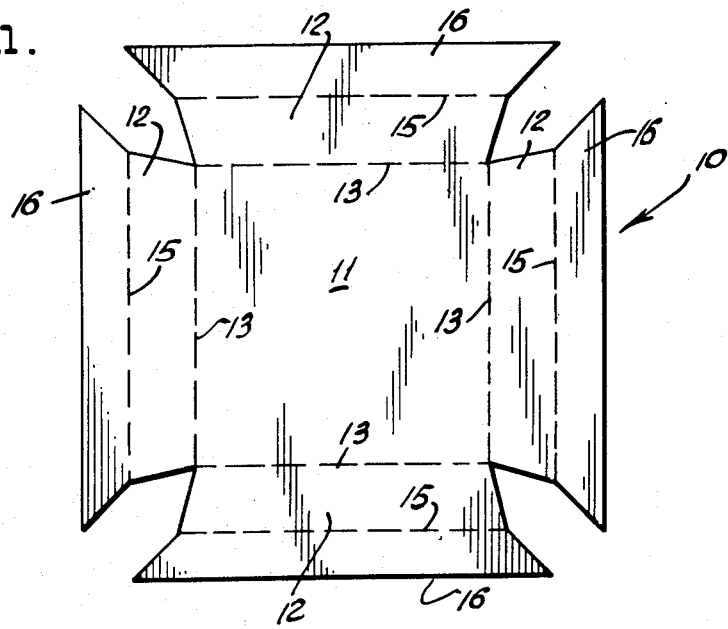
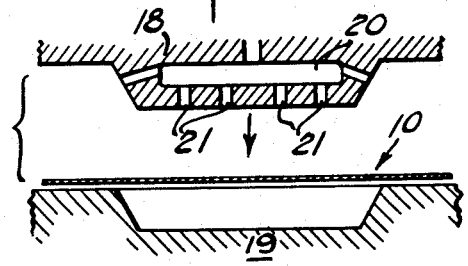
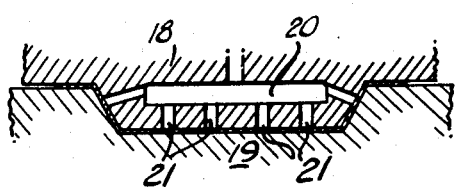
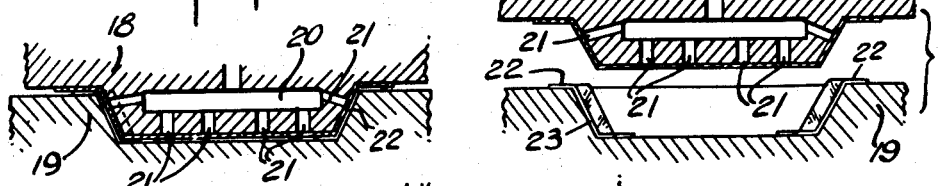
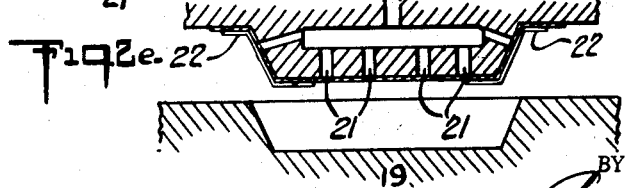
INVENTOR:
BERNARD D. BEAMISH
BY
*Arnold J. Norfolk*
ATTORNEY.

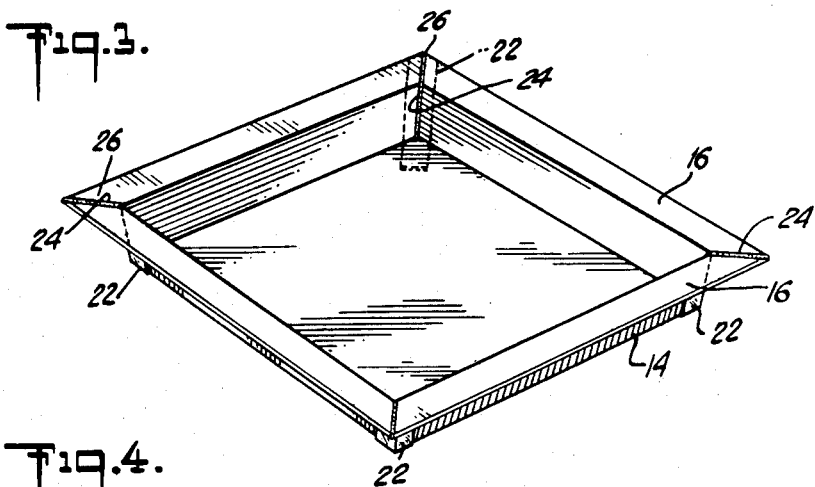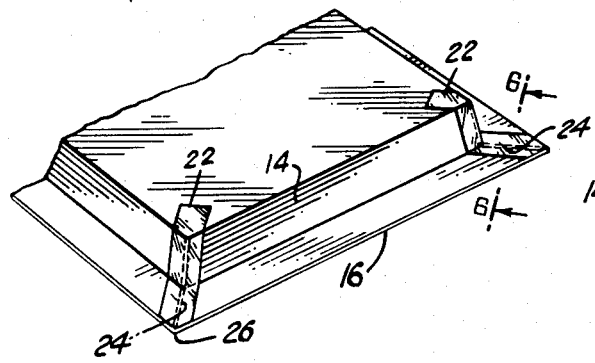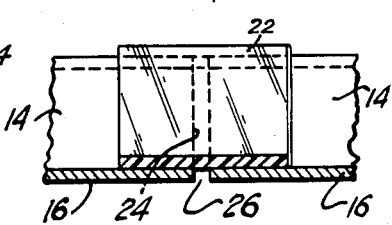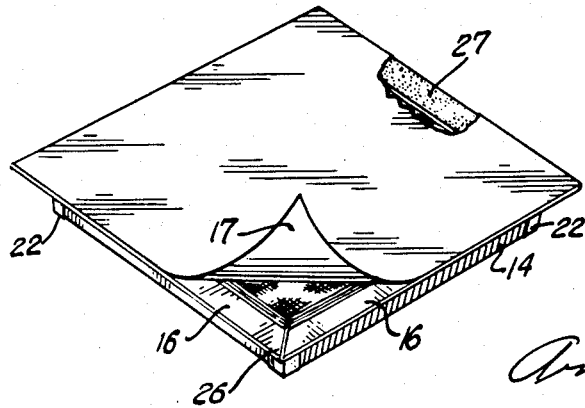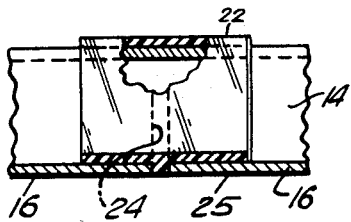

3,191,508
METHOD OF MANUFACTURING CONTAINERS
Bernard D. Beamish, New Rochelle, N.Y., assignor to Johnson & Johnson, a corporation of New Jersey
Original application Feb. 12, 1960, Ser. No. 8,373, now Patent No. 3,104,012, dated Sept. 17, 1963. Divided and this application Nov. 16, 1962, Ser. No. 243,966
2 Claims. (Cl. 93—36)

The present invention is directed to a method of manufacturing containers from flat, foldable sheet material. This application is a division of copending application Serial No. 8,373, filed February 12, 1960, now Patent 3,104,012, issued September 17, 1963. Although the process of the present invention and the resulting containers are not limited to the manufacture and use of the containers for packaging sterile products, the containers are particularly well suited for this purpose.

In containers for surgical sponges and the like, the container should preferably be of relatively low cost since it is generally discarded after it has once been opened and the sterile contents removed. However, the container once sealed must be impervious with respect to the entrance of any bacteria or other harmful organisms which would otherwise contaminate the sterile products sealed therein.

It is accordingly an object of the present invention to make containers from paper or other flexible, relatively inexpensive sheet material which are free from any channels or other openings through which bacteria or other contamination might enter. It is a further object to provide a process for making such containers in an efficient and relatively inexpensive manner. Other objects and advantages of this invention will become apparent from the following description taken in connection with the accompanying drawings, wherein are set forth by way of illustration and example certain embodiments of this invention.

Referring to the drawings:

FIG. 1 illustrates a flat blank from which a container is formed;

FIGS. 2a through 2e illustrate the series of steps followed in forming the blank into a container;

FIG. 3 is a perspective view looking down into a finished container;

FIG. 4 is a perspective view of a portion of the underside of a finished container;

FIG. 5 is a cross-sectional detailed view of a corner of the partially formed container of sub-figure 2d;

FIG. 6 is an enlarged cross-sectional view taken along line 6—6 of FIG. 4 with certain parts broken away; and FIG. 7 illustrates a finished container with a cover sealed thereon which has been partially removed.

In making containers in accordance with the present invention, a blank 10 is first formed out of a flat sheet of paper or similar material. Referring to the drawings, this blank contains a rectangular bottom portion 11, and extending edges 12, which extend substantially at right angles to each other. In forming a container from this blank, these extending edges are bent along fold lines 13 to form the container sides 14, and along fold lines 15 for forming a container rim 16 to which a flexible cover 17 is secured as illustrated in FIGURE 7.

In the particular embodiment shown, it will be noted that the angle between adjacent extending portions 12 is somewhat less than a right angle. This gives a slope to the container sides, making the container somewhat larger at its mouth than at the bottom to provide for easier removal of sponges or other contents which may be packaged therein.

Formation of the container is best illustrated by reference to the series of FIGURES 2a through 2e. In forming the container, a pair of co-acting die members 18 and 19 are used. These dies are heated, by any conventional means not shown, to a temperature sufficiently high to cause flow of the particular thermoplastic film used.

The upper male die member 18 is provided with a vacuum chamber 20 and passages 21 extending from the vacuum chamber 20 to the exterior surface of the die to provide a vacuum for holding the folded blank into die member 18 during removal as hereinafter described.

The blank 10 is placed over the female die member 19 as illustrated in FIGURE 2a and the die member 18 lowered as shown in FIGURE 2b to push the blank 10 down into the die member 19. As the blank is moved into the die member 19, the extending edges 12 are forced upwards and the blank is bent along fold lines 13 and 15 to form the sides 14 and flange or rim 16 of the container.

After the die members 18 and 19 have been brought together to bend the blank 10 into the form of the final container, as illustrated in FIGURE 2c, a vacuum is applied to the die member 18 to hold the formed blank 10 in intimate contact with the forming die member 18. Die member 18 is then raised with the formed blank 10 as illustrated in FIGURE 2e and strips 22 of thermoplastic sheet material are placed across the corners 14 of die member 19. Die member 18 with the formed blank 10 adhering thereto is then again lowered as illustrated in FIGURE 2d, and pressed firmly into die member 19. The pressure and heat fuse the film into intimate contact with the sides 14 and flange 16 at the corners of the container to firmly secure the folded sides and flange in their folded or formed positions. The softened thermoplastic film is also forced into any spaces or channels that might otherwise exist at the container corners between the meeting edges of the sides and flange sections. This is best illustrated by FIGURES 5 and 6 of the drawings. FIGURE 5 is an enlarged cross-section through a corner of the flange of the container during manufacture at the stage illustrated in FIGURE 2d just prior to the application of combined heat and pressure. It will be noted that the channel 24 between the meeting edges of the flange 16 is open. In FIGURE 6 which illustrates the same corner of the finished container, it will be noted that the thermoplastic film material 22 has been caused to flow into the channel 24 to completely fill the same and provide a flat, channelless surface 25 to which the cover sheet 17 can then be secured.

Die member 18, after the thermoplastic film 22 has been fused to the corners, is then again raised while a vacuum is applied to raise the formed container up out of die member 19. The film is then permitted to cool after which the vacuum is released and the container permitted to drop from die member 18.

Cooling can be expedited by blowing cool air onto the corners of the formed container by cooling die member 18 or in any other manner, if desired, to more rapidly set the thermoplastic film.

Any thermoplastic film with sufficiently high softening temperature to permit its practical use in the finished container may be employed for the film strip 22. The temperature of the die members 18 and 19 will depend on the softening temperatures of the film employed. The pressures used may vary substantially. It generally is not necessary however, to use pressures much in excess of about 50 pounds per square inch. For example, in forming containers of a standard 35 to 60 pound weight paper, pressures of only about 50 pounds per square inch were required to obtain strong, channel-free corners when using polyvinyl chloride film strips and die temperatures varying in the range of about 400° to 475° F.

Because of the thermoplastic nature of the film, the applied heat and pressure during formation cause the thermoplastic material to flow into and fill up any spaces or channels that might otherwise exist at the corners of the container or at the corners of the flange 16. This not only gives corners which are free of any channels but provides a flange 16 that has a flat, uniform surface even at the junctures 26. There are accordingly no unfilled channels remaining when a flat flexible cover sheet 17 is later applied and cemented as by adhesive 27, or otherwise bonded to the flange for sealing the container.

If desired, the cover may protrude beyond the flange 16 of the container in some area, such as along one side of the flange so that the same may be readily grasped for peeling the cover back off of the container when the same is being opened.

Although containers made in the manner herein described are particularly useful for the packaging of sterile articles, they may be used for the inexpensive packaging of any item where it is desired to protect the packaged item from contamination. If it is desired that the resulting container be completely sealed to the entry of air, as in an air or gas tight package, the sheet material used in forming the container and cover should be one that is substantially air impermeable. Such a material, for example, would be a resin impregnated paper. Since the containers of the present invention are devoid of any air channels at the meeting edges, when the container and cover are made of air impervious material the resulting container when sealed closed is essentially air or gas tight. Such containers are particularly useful for the packaging of food or any other product where it is desirable that the container be sealed against the entry of air.

In describing the invention, a particular shape of container has been illustrated. Containers of other shapes can readily be made by the same process and the invention is not to be limited to the particular shape or form of container illustrated herein, but is to be limited only by the appended claims.

Having thus described my invention, I claim:

1. The method of making containers comprising forming a container blank of sheet material having a center portion and oppositely extending side portions (disposed at right angles), placing said blank over a concave die member having an inner contour the same as that of the outer contour of the finished container, pressing a convex die member having an outer contour the same as that of the inside of said container onto said blank to force said blank into said concave die member, said die members co-acting to fold the extending side portions of said blank with respect to said center portion to form container sides and container corners, holding said blank with said extending side portions so folded on said convex die member while said die members are separated, placing sheeted thermoplastic material over the corners of said concave die member, bringing said convex die member with the folded blank thereon into said concave die member and heating said thermoplastic sheet material to above its flow temperature while pressing said die members together to fuse said thermoplastic sheet material to said folded blank over the corners of said container and stabilize said folded blank in the form of said container.

2. The method of making containers comprising forming a container blank of a sheet of paper said blank having a center portion and oppositely extending side portions disposed at right angles, said extending side portions adapted to be folded in one direction along the edge of said center portion to form container sides and to be folded in the opposite direction along a line equidistant for each side portion from the end thereof to form a container flange, placing said blank over a concave die member having an inner contour the same as that of the outer contour of the finished container, pressing a convex die member, having an outer contour the same as that of the inside of said container and adapted to have a vacuum applied to its surface, onto said blank to force said blank into said concave die member, said die members co-acting to fold the extending side portions of said blank with respect to said center portion to form container sides, container corners and a container rim, applying a vacuum to said convex die member to hold said blank with said extending side portions so folded on said convex die member, separating said die members, placing sheeted thermoplastic material over the corners of said concave die member, bringing said convex die member with said folded container blank thereon into said concave die member, and heating said thermoplastic sheet material to above its flow temperature while pressing said die members together to cause said thermoplastic material to flow into any channels existing between adjacent edges of said folded side portions and to fuse said sheeted thermoplastic sheet material to said folded blank over the container corners, separating said die members while holding said formed container on said convex die member by vacuum, and releasing said vacuum to separate said formed container from said convex die member.

References Cited by the Examiner

UNITED STATES PATENTS

| | | | |
|---|---|---|---|
| 2,392,734 | 1/46 | Haberstump | 154—43 |
| 2,797,843 | 7/57 | Orlins | 154—43 |
| 2,982,188 | 5/61 | Von Hofe et al. | 93—41 |
| 3,080,796 | 3/63 | Twitchell et al. | 93—41 |

FRANK E. BAILEY, *Primary Examiner.*